UNITED STATES PATENT OFFICE.

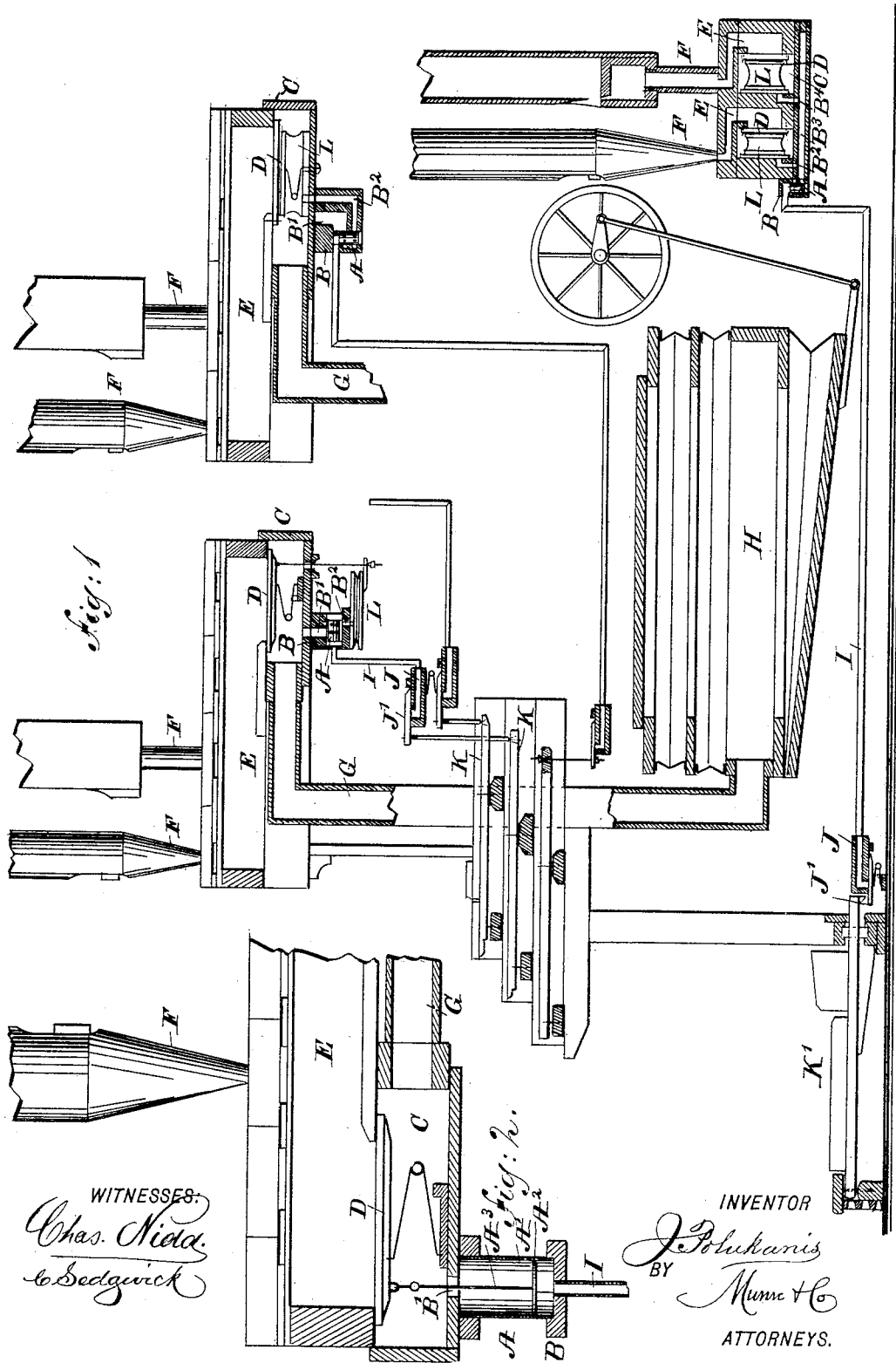

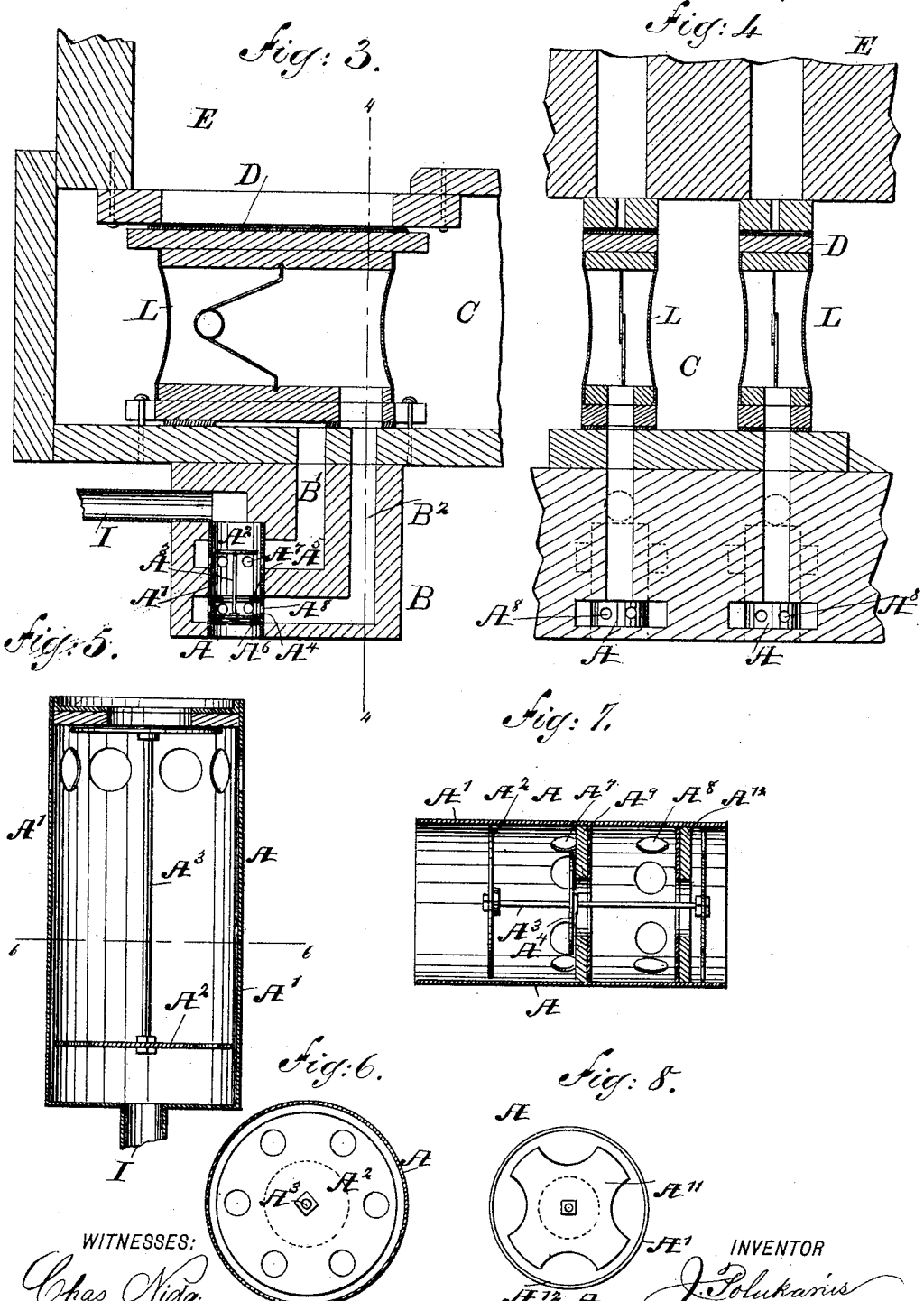

JERZY POLUKANIS, OF BLOOMFIELD, NEW JERSEY.

ORGAN.

SPECIFICATION forming part of Letters Patent No. 499,036, dated June 6, 1893.

Application filed November 18, 1892. Serial No. 452,375. (No model.)

*To all whom it may concern:*

Be it known that I, JERZY POLUKANIS, of Bloomfield, in the county of Essex and State of New Jersey, have invented new and useful Improvements in Organs, of which the following is a full, clear, and exact description.

The invention relates to pipe organs, and its object is to provide certain new and useful improvements in organs whereby a rapid sounding of the pipes is obtained, and the performer is enabled to easily manipulate the keys.

The invention consists of a self-acting pneumatic valve adapted to be actuated by the wind from the wind box, on releasing air from the said valve by means of the keys or pedals.

The invention also consists in certain parts and details and combinations of the same, as will be hereinafter described and then pointed out in the claims.

Reference is to be had to the accompanying drawings, forming a part of this specification, in which similar letters of reference indicate corresponding parts in all the figures.

Figure 1 is a transverse section of the improvement. Fig. 2 is a like view with a modified form of valve. Fig. 3 is an enlarged transverse section of the improvement. Fig. 4 is a sectional side elevation of the same on the line 4—4 of Fig. 3. Fig. 5 is an enlarged sectional side elevation of another form of valve. Fig. 6 is a cross section of the same on the line 6—6 in Fig. 5. Fig. 7 is a sectional side elevation of another form of valve; and Fig. 8 is an end view of the same.

The improvement consists in a self-acting pneumatic valve A preferably held in a casing B attached to the wind box C containing the pallets D connecting the wind box with the wind chest E connected in the usual manner with the pipes F. Into the wind box C discharges the trunk G leading from the bellows H, as is plainly shown in Fig. 1.

One end of the valve A connects by a pipe I with a valve casing J, the valve $J'$ of which is directly connected with a corresponding key K or pedal $K'$, so that when the keys or pedals are actuated the valve $J'$ is opened to permit air to escape from the valve casing J, the pipe I and one end of the valve A for actuating the latter, as presently to be described.

The casing B, as shown in Fig. 1, is provided with a channel $B'$ leading to the wind box C and with a second channel $B^2$ connected with a pneumatic action L of any approved construction, the said pneumatic action being connected with the corresponding pallet D, so as to open or close the same to permit the wind to pass from the wind box C to the wind chest E and the pipes F. Thus, when air is released from the valve A, by manipulating either the keys K or the pedals $K'$, the said valve is actuated by a preponderance of air pressure from the wind box C to connect the latter with the pneumatic action L or to connect the latter with the outer air so that the pneumatic action actuates the corresponding pallet D. The latter is thus opened and air from the wind box C passes to the wind chest E and to the pipes F.

The valve A may be of various constructions, some of the principal forms being illustrated in Figs. 3, 4, 5, 6, 7 and 8, the construction of the valve depending to a large extent, on the special construction of the pneumatic action L. The latter may be entirely omitted and the valve A directly connected with the pallet D, as shown in Fig. 2, thus necessitating still another form of valve hereinafter more fully described. As shown in Figs. 3 and 4 the pneumatic action L is located within the wind box C and carries on its top the pallet D which is normally held closed by the spring in the pneumatic action. Now, when the interior of the latter is connected with the outer air, then the air pressure within the wind box C compresses the flexible wall of the pneumatic action L so that the latter collapses and carries the pallet D downward thus establishing communication between the wind box C and the wind chest E. This valve A, as shown in Figs. 3 and 4, is provided with a valve casing $A'$ preferably made cylindrical in form and opening at its upper end to the pipe I, and at its lower end to the outer air. In the upper end of the valve casing $A'$ is fitted to slide a piston $A^2$ connected by a valve stem $A^3$ with a second valve piston $A^4$ adapted to be alternately seated on valve seats $A^5$ and $A^6$ arranged within the casing $A'$. The channel $B'$ in the casing B and connected with the wind box C, connects with the interior of the valve casing $A'$ by registering apertures $A^7$ and the other channel $B^2$, leading from the pneumatic action L connects with the interior of the valve casing A' by registering apertures $A^8$ formed in the wall of the said valve casing A'. The apertures $A^8$ are arranged between the valve seats $A^5$ and $A^6$, so that when the piston valve $A^4$ is in a lowermost position, as shown in Fig. 3, then communication is established between the wind box C and the interior of the pneumatic action L so that the latter remains inflated and the pallet D is held on its seat, thus disconnecting the wind box from the wind chest. Now, when it is desired to open the pallet D, the operator in playing the respective key K, opens the valve J' so that a preponderance of pressure is on the under side of the piston $A^2$ in the valve casing A' whereby the said piston is forced upward by the air pressure from the wind box C. The upward sliding movement of the piston $A^2$ causes the piston valve $A^4$ to be unseated from the seat $A^6$ and seated on the under side of the seat $A^5$, thus disconnecting the channels B' and $B^2$ and likewise the wind box C from the interior of the pneumatic action L. The latter is now connected by the channel $B^2$, the apertures $A^8$, and the open valve seat $A^6$ with the outer air, so that the preponderance of pressure within the wind box causes the pneumatic action to collapse so that the pallet D is opened. As soon as the operator releases the pressure on the key K, the valve J' is closed whereby the preponderance of pressure of air from the wind box C on the top of the piston valve $A^4$ causes the latter to slide downward back to its normal position, shown in Fig. 3, thus again establishing communication between the wind box C and the interior of the pneumatic action L, so that the latter is again inflated and the pallet D is closed. The piston $A^2$ is fitted loosely in the casing A' to permit a small amount of air to leak past the edge of the piston into the tube I leading to the valve J. By this arrangement the valve will respond instantaneously to the action of the air pressure on opening the valve J, no matter how the keys are separated from the wind chest.

In case the pneumatic action L is outside of the wind box C, as shown to the left in Fig. 1, and the said action is attached to the casing B, then I prefer the construction of valve shown in Fig. 7, whereby on opening the valve J', the preponderance of pressure on the piston $A^2$ connects the interior of the wind chest C with the said pneumatic action so as to inflate the same and thereby cause the opening of the pallet D. The valve casing A', in this case, has its sets of apertures $A^7$ and $A^8$, registering with the channels B' and $B^2$, respectively, of which the former leads to the wind box C and the other to the interior of the exterior pneumatic action L. The piston valve $A^4$ is adapted to be seated on top of a valve seat $A^9$, while a second piston valve $A^{11}$ is adapted to be seated on the under side of a valve seat $A^{12}$. Now, when the upper end of the casing A' is connected with the outer air by the opening of the valve J', then the pressure from the wind box C causes the piston $A^2$ and the piston valves $A^4$ and $A^{11}$ to slide in the casing A', so that the piston valve $A^4$ is unseated from its seat $A^9$ and the other piston valve $A^{11}$ is seated on the seat $A^{12}$, thus closing the same. The air can now pass from the wind box C through the channel B', the openings $A^7$ and valve seat $A^9$, to the apertures $A^8$ into the channel $B^2$ and then into the pneumatic action L, thus inflating the same to cause the pallet D to open. As soon as the key is released and the valve J' seated, then the pressure on the valve $A^{11}$ causes an unseating of the said valve and a backward movement of the piston $A^2$ and the piston $A^4$ until the latter is again seated on its seat $A^9$. The interior of the pneumatic action L is now connected with the outer air by the channel $B^2$, the apertures $A^8$, the open valve seat $A^{12}$, and the open end of the valve casing A' leading to the outer air. As shown to the right in Fig. 1, pneumatic actions L are arranged within the wind box C and are similar to the ones shown in Figs. 3 and 4, but the valve A in this case is actuated by manipulating the pedal K'. This valve A is arranged at one end of a pipe $B^3$ connected by channels $B^4$ with the several pneumatic actions L so that when the valve A is actuated by preponderance of pressure on one side of the piston $A^2$, then the several pneumatic actions collapse to open the pallets D.

As shown in Fig. 2, the valve A only consists of the casing A' and the piston $A^2$ having its piston rod $A^3$ directly connected with the pallet D. The upper end of the casing A' is connected by the channel B' with the interior of the wind box C, while the lower end of the said valve casing is connected with the pipe I. Now, when the valve J' is opened, the preponderance of pressure on the top of the piston $A^2$ causes a downward movement of the same, so that the pallet D is opened and as soon as the valve J' is closed, the spring of the pallet D will again cause the latter to close, at the same time returning the piston $A^2$ to its former position. It will be seen that by this construction, the pallet D can be very rapidly actuated by manipulating the keys or the pedals, and it is understood that the valve A is entirely automatic in operation, being controlled by a preponderance of pressure from the wind box at the time the keys or pedals are actuated.

Having thus fully described my invention, I claim as new and desire to secure by Letters Patent—

1. An organ valve comprising a tube A, provided with lateral openings for admission of air from the wind box, open at its outer end for communication with the outer air and at its opposite or inner end adapted to connect with the key or pedal valves, a sliding leak piston $A^2$, within the inner end of the tube and having a stem $A^3$ on its inner side provided with a disk-valve mechanism, substantially as set forth.

2. An organ valve comprising the tube A provided with two sets of lateral apertures $A^7 A^8$ between its ends for connection with the wind box and pneumatic action respectively, two annular valve seats $A^5 A^6$ in the said tubes at opposite sides of the outer apertures $A^8$, a loose or leak piston $A^2$ sliding in the tube above the apertures $A^7$, a stem depending from said piston and having a disk valve $A^4$ on its outer end between the two valve seats; the outer end of the tube being open to the outer air and the inner end being adapted to communicate with the key or pedal valves, substantially as set forth.

JERZY POLUKANIS.

Witnesses:
   THEO. G. HOSTER,
   C. SEDGWICK.